(12) United States Patent
Tang et al.

(10) Patent No.: US 11,923,902 B2
(45) Date of Patent: Mar. 5, 2024

(54) ACTIVE OPTICAL CABLE CONNECTOR AND ACTIVE OPTICAL CABLE ASSEMBLY

(71) Applicant: Shenzhen 8k-link Optoelectronics Technology Co., Ltd., Shenzhen (CN)

(72) Inventors: Lingfeng Tang, Shenzhen (CN); Jun Jiang, Shenzhen (CN); Xinghui Jin, Shenzhen (CN)

(73) Assignee: Shenzhen 8k-link Optoelectronics Technology Co., Ltd., Shenzhen (CA)

( * ) Notice: Subject to any disclaimer, the term of this patent is extended or adjusted under 35 U.S.C. 154(b) by 0 days.

(21) Appl. No.: 17/812,029

(22) Filed: Jul. 12, 2022

(65) Prior Publication Data

US 2023/0008442 A1    Jan. 12, 2023

(30) Foreign Application Priority Data

Jul. 12, 2021    (CN) .......................... 202110787229.4

(51) Int. Cl.
  *H04B 10/00*    (2013.01)
  *G02B 6/42*    (2006.01)
  *H04B 1/7163*    (2011.01)
  *H04B 10/114*    (2013.01)

(52) U.S. Cl.
  CPC ........... *H04B 10/114* (2013.01); *G02B 6/428* (2013.01); *H04B 1/7163* (2013.01)

(58) Field of Classification Search
  CPC .... H04B 10/114; H04B 1/7163; G02B 6/428; G02B 6/4274; G02B 6/4201
  See application file for complete search history.

(56) References Cited

U.S. PATENT DOCUMENTS

| | | | | |
|---|---|---|---|---|
| 7,841,776 B2* | 11/2010 | DiFonzo | ................ | H01R 24/00 385/74 |
| 9,112,601 B2* | 8/2015 | Gao | ..................... | H04B 10/073 |
| 9,419,710 B2* | 8/2016 | Böldicke | ............ | H04B 10/0795 |
| 9,791,634 B2* | 10/2017 | DiFonzo | ............. | G02B 6/3817 |
| 9,935,381 B2* | 4/2018 | Nagumo | .............. | H04N 9/3141 |
| 10,347,960 B2* | 7/2019 | Kikuchi | ................. | H01R 24/28 |

(Continued)

FOREIGN PATENT DOCUMENTS

| | | |
|---|---|---|
| CN | 102200617 A | 9/2011 |
| CN | 205826916 U | 12/2015 |

(Continued)

OTHER PUBLICATIONS

First Office Action for CN Patent Application No. 2202110787229.4 dated May 27, 2022.

*Primary Examiner* — Agustin Bello
(74) *Attorney, Agent, or Firm* — Thomas | Horstemeyer, LLP

(57) ABSTRACT

The present disclosure relates to an active optical cable connector and an active optical cable assembly. The active optical cable connector includes a power supply interface, an optoelectronic conversion module and a short-range wireless communication module, wherein the power supply interface is electrically connected with the optoelectronic conversion module and the short-range wireless communication module, respectively, and the short-range wireless communication module is configured to transmit a control signal and a low-speed signal of the active optical cable.

9 Claims, 4 Drawing Sheets

(56) References Cited

U.S. PATENT DOCUMENTS

| | | | |
|---|---|---|---|
| 10,541,557 B2* | 1/2020 | Byrne | H02J 13/00036 |
| 10,873,402 B2* | 12/2020 | Giziewicz | G02B 6/4416 |
| 11,239,911 B2* | 2/2022 | Jung | H04B 10/25751 |
| 11,298,003 B2* | 4/2022 | Duckett, III | A61B 1/042 |
| 11,388,374 B2* | 7/2022 | Tong | H04N 21/4183 |
| 2002/0044746 A1* | 4/2002 | Kronlund | G02B 6/4284 |
| | | | 385/101 |
| 2004/0022304 A1* | 2/2004 | Santhoff | H04B 1/71632 |
| | | | 375/257 |
| 2004/0214522 A1* | 10/2004 | Santhoff | H04B 3/542 |
| | | | 455/45 |
| 2004/0218688 A1* | 11/2004 | Santhoff | H04B 10/25751 |
| | | | 375/295 |
| 2004/0233877 A1* | 11/2004 | Lee | H04B 10/25752 |
| | | | 370/338 |
| 2005/0105913 A1* | 5/2005 | Ozeki | H04B 10/07955 |
| | | | 398/140 |
| 2007/0085516 A1* | 4/2007 | Fenwick | G06F 1/26 |
| | | | 713/300 |
| 2007/0291938 A1* | 12/2007 | Rao | G09G 5/006 |
| | | | 380/210 |
| 2012/0086935 A1* | 4/2012 | Smith | H04B 10/073 |
| | | | 356/73.1 |
| 2014/0023312 A1* | 1/2014 | Shang | H04B 10/40 |
| | | | 385/12 |
| 2014/0133846 A1* | 5/2014 | Gao | H04B 10/40 |
| | | | 398/16 |
| 2016/0056890 A1* | 2/2016 | Böldicke | H04B 10/0731 |
| | | | 398/25 |
| 2019/0013889 A1* | 1/2019 | Shintani | H04N 7/22 |
| 2019/0171013 A1* | 6/2019 | Hu | G06F 3/013 |
| 2020/0187758 A1* | 6/2020 | Duckett, III | A61B 1/00114 |
| 2020/0350997 A1* | 11/2020 | Giziewicz | H01B 11/22 |
| 2021/0105068 A1* | 4/2021 | Jung | H04B 10/0795 |
| 2021/0149134 A1* | 5/2021 | Lai | G02B 6/4292 |
| 2022/0052767 A1* | 2/2022 | Sipes, Jr. | H04B 10/073 |
| 2023/0008442 A1* | 1/2023 | Tang | G02B 6/428 |

FOREIGN PATENT DOCUMENTS

| | | |
|---|---|---|
| CN | 106131516 A | 11/2016 |
| CN | 210839865 U | 6/2020 |
| CN | 212649472 U | 3/2021 |

* cited by examiner

ACTIVE OPTICAL CABLE CONNECTOR AND ACTIVE OPTICAL CABLE ASSEMBLY

CROSS REFERENCE

The present application is based upon and claims priority to Chinese Patent Application No. 202110787229.4, filed on Jul. 12, 2021, and the entire contents thereof are incorporated herein by reference.

TECHNICAL FIELD

The present disclosure relates to the field of active optical fiber, in particular to an active optical cable connector and an active optical cable assembly.

BACKGROUND

With the advancement of optical fiber communication technology, high-performance active optical cables have gradually entered the public field from data centers. Active optical cable (AOC) has been widely praised by the industry for its many superior characteristics, which also promote the application of the AOC. The AOC may include copper cables mixed inside the active optical cable, to adapt to the application environment of low-speed data transmission.

It should be noted that, information disclosed in the above background portion is provided only for better understanding of the background of the present disclosure, and thus it may contain information that does not form the prior art known by those ordinary skilled in the art.

SUMMARY

A first aspect of the present disclosure provides an active optical cable connector, including a power supply interface, an optoelectronic conversion module and a short-range wireless communication module, wherein the power supply interface is electrically connected with the optoelectronic conversion module and the short-range wireless communication module, respectively, and the short-range wireless communication module is configured to transmit a control signal and a low-speed signal of the active optical cable.

In some embodiments, the control signal includes an optical cable handshake signal, an EMARK detection signal and an interface plug-in detection signal.

Further, the short-range wireless communication module is at least one of a Bluetooth module, a ZigBee module, an NFC module or a UWB module.

Furthermore, the wireless communication module includes the UWB module, and the UWB module is mounted by an SMT process.

Optionally, the UWB module includes a positioning unit, and the positioning unit is configured to position the optoelectronic conversion module.

In the above embodiment, the optoelectronic conversion module includes a transmitting unit and a receiving unit. The transmitting unit includes a driving chip, a laser emitting array and a lens and the receiving unit includes laser signal detector and an amplifying chip.

According to a second aspect of the present disclosure, there is provided an active optical cable assembly including an active optical cable and active optical cable connectors disposed at both sides of the active optical cable. The active optical cable connectors may be the active optical cable connector according to the first aspect.

Further, the active optical cable and the active optical cable connector are fixed by a COB process and an optical fiber end face processing process.

Further, an outer diameter of the active optical cable is not more than 5 mm.

It is to be understood that both the foregoing general description and the following detailed description are exemplary and explanatory only and are not restrictive of the disclosure, as claimed.

This section provides a summary of various implementations or examples of the technology described in the disclosure, and is not a comprehensive disclosure of the full scope or all features of the disclosed technology.

DETAILED DESCRIPTION

The principles and features of the present disclosure will be described below with reference to the accompanying drawings. The examples are only used to explain the present disclosure, but not to limit the scope of the present disclosure.

The terms such as "first", "second", "third", "fourth" (if any) in the description, the claims, and the above-mentioned drawings of this disclosure are used to distinguish similar objects and are not necessarily used to describe a specific order or sequence. It is to be understood that the numbers so used may be interchanged under appropriate circumstances so that the embodiments of the disclosure described herein can be practiced in sequences other than those illustrated or described herein. Furthermore, the terms "comprising" and "having", and any variations thereof, are intended to cover non-exclusive inclusion, for example, a process, method, system, product or device comprising a series of steps or units is not necessarily limited to those expressly listed. Rather, it may include other steps or units not expressly listed or inherent to these processes, methods, products or devices.

Figure 1:
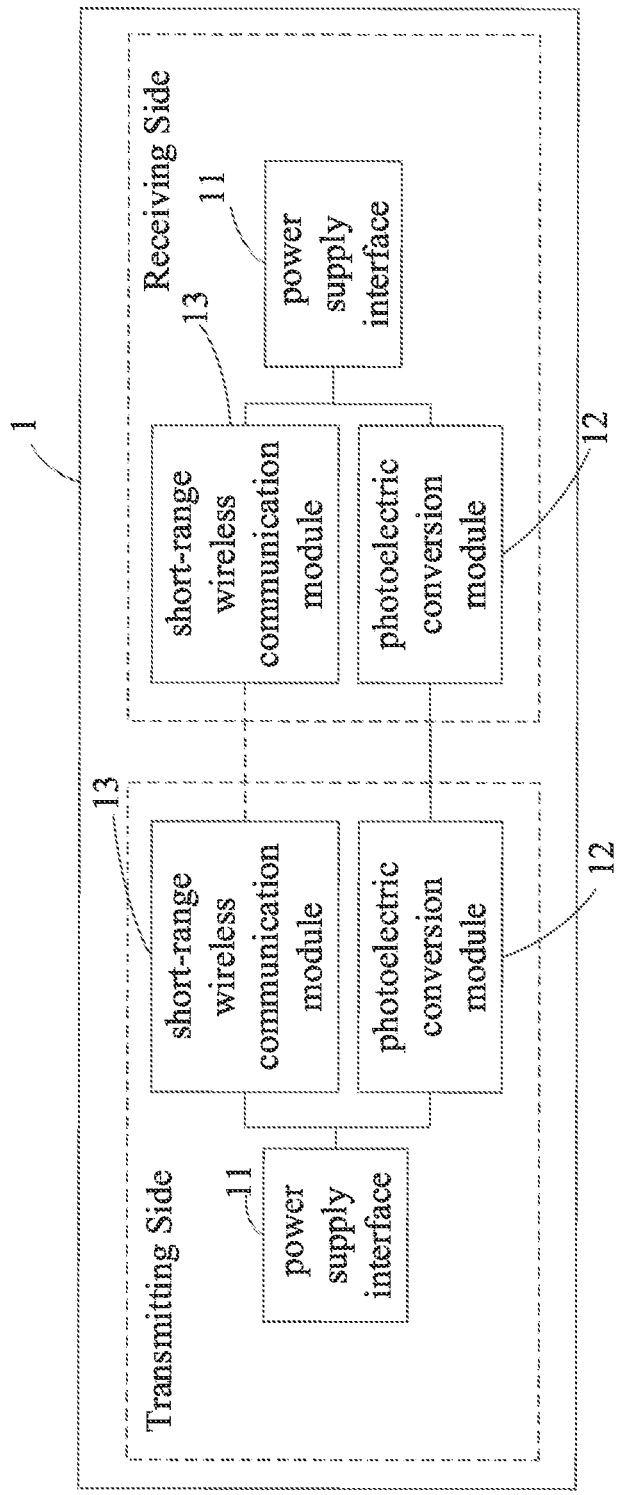
FIG. 1 is a structural block diagram of an active optical cable connector in some embodiments of the present disclosure.
Figure 2:
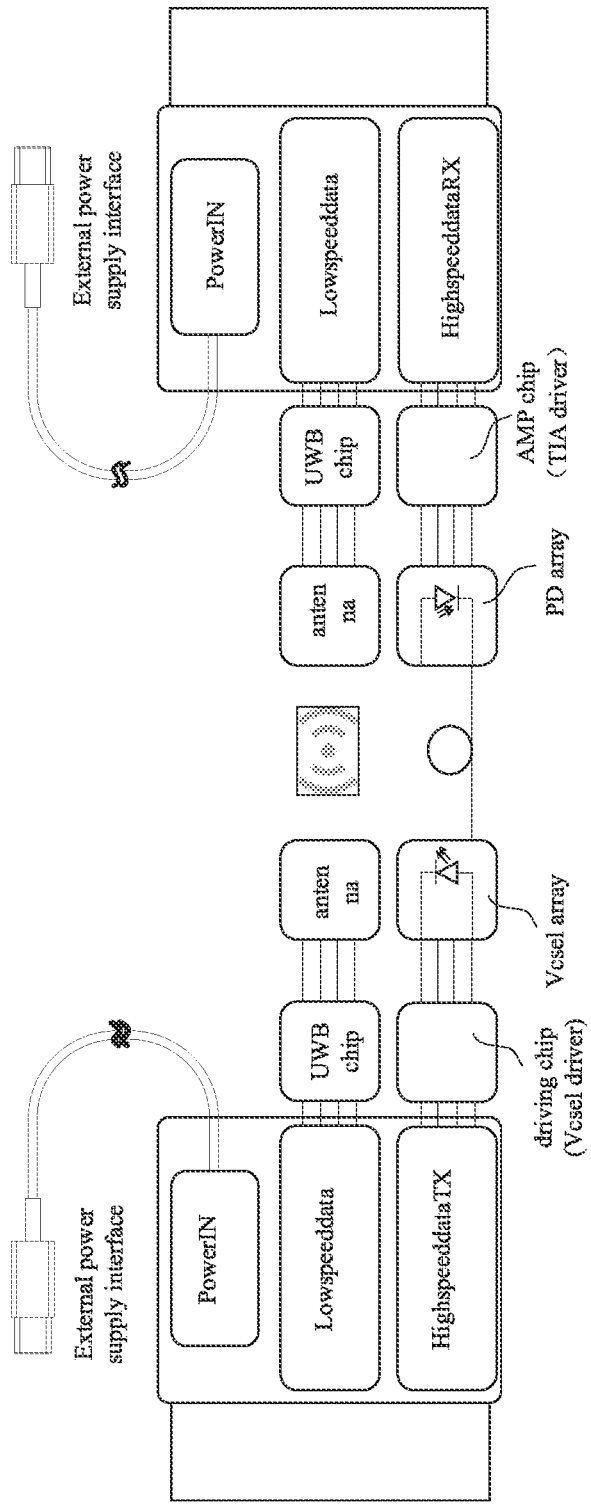
FIG. 2 is a detailed structural block diagram of an active optical cable connector in some embodiments of the present disclosure.

Referring to FIG. 1 and FIG. 2, in a first aspect of the present disclosure, an active optical cable connector 1 is provided, including a power supply interface 11, an optoelectronic conversion module 12 and a short-range wireless communication module 13. The power supply interface 11 is electrically connected with the optoelectronic conversion module 12 and the short-range wireless communication module 13, respectively. The short-range wireless communication module 13 is used to transmit the control signal and the low-speed signal of the active optical cable.

It can be understood that the active optical cable connector 1 includes at least one transmitter (Tx) and one receiver (RX), and each transmitter and receiver includes an optoelectronic conversion module 12 and a short-range wireless communication module 13 to realize data transmission and related interactions. The above-mentioned power supply interface 11, optoelectronic conversion module 12 and short-range wireless communication module 13 are integrated into one or more PCB boards through an integration process. The power supply interface 11 is located at the end of the PCB (not limited to the end), and the interface is in the form defined by Type-C, HDMI, DP or other general interface protocols such as USB (Universal Serial Bus). The specific function of each contact or pin in the power supply interface 11 is specifically configured according to the above-mentioned interface protocol, while the particular form does not affect the fact that in the present disclosure, the power supply interface 11 supplies power or data to the optoelectronic conversion module 12 and the short-range wireless communication module 13 respectively through independent contacts (pins) or other wiring form.

In order to replace the role of the copper cable in the active optical cable, the function of the original copper cable, i.e., transmitting the control signal and low-speed signal of the active optical cable, is realized through the interaction between the short-range wireless communication module 13 and the terminal equipment (host computer) at both ends of the active optical cable connector. Specifically, in some embodiments, the control signal includes an optical cable handshake signal, an EMARK detection signal, and an interface plugging and unplugging detection signal. The EMARK detection signal includes power detection, the interface plugging and unplugging detection signal includes signals for detecting correct/reversed insertion of the interface, for detecting well-contact of the interface, and the like. It should be noted that the above-mentioned low-speed signal is relative to optical cable communication, that is, lower than the normal transmission rate of general optical cable communication.

Further, the short-range wireless communication module 13 is at least one of a Bluetooth module, a ZigBee module, an NFC module or a UWB (Ultra Wide-Band) module.

In order to improve anti-interference and bandwidth, further, the wireless communication module is a UWB module, and the UWB module is surface-mounted by SMT process.

Optionally, in order to better detect the transmission failure of the active optical cable, the UWB module includes a positioning unit, and the positioning unit is configured to position the optoelectronic conversion module 12. When the active optical cable is displaced or falls off, the positioning unit can detect it in time to facilitate reminders or maintenance.

The core principle of UWB positioning is ToA (Time of Arrival), which obtains the distance according to the transmission time when the transmission speed of the signal is known. ToA can be further classified into TDoA (Time Difference of Arrival), TWR (Two-Way Ranging), and PDoA (Phase Difference of Arrival).

Optionally, the UWB module uses Decawave-/-DW1000, NXP-/-NCJ29D5FS, SparkMicro-/-SR1000, Alereon-/-AL5x00, BeSpoon-/-MOD 1 (module). The particular parameters of the Decawave is:

Datarate 110 kbps/850 kbps/6.8 Mbps;
RX Sensitivity: −106 dBm@110 kbps; −97@6.8 Mbps;
RX Current: 30 mA@3.3V;
Max TX Pwr: −9.3 dBm;
TX Current: 70 mA@3.3V.

In the above embodiment, the optoelectronic conversion module 12 includes a transmitting unit and a receiving unit. The transmitting unit includes a driving chip, a laser emission array and a lens. The receiving unit includes a laser signal detector and an amplifying chip (amplifying circuit).

Optionally, the transmitting unit may include: a light source, a driving circuit, and a control circuit, and has the functions of transmitting prohibition and monitoring output. The driving circuit in the module includes a buffer stage for shaping the output waveform, as well as automatic power compensation and temperature compensation circuits to ensure stable power and extinction ratio. The transmitting unit has the function to convert data signals into optical signals and send them to optical fibers for transmission. The driving circuit mainly includes sub-circuits such as signal modulation, static operating point adjustment and automatic power control.

It is understood that the term "optoelectronic module (commonly known as optical module)" or "optoelectronic conversion module" includes a module having both optical and electronic components. Examples of optoelectronic modules include, but are not limited to, active cables, active optical cables, repeaters, transceivers, transmitters, and/or receivers. By way of example, optoelectronic modules may be used in telecommunications networks, local area networks, metropolitan area networks, storage area networks, wide area networks, etc., and may be configured to conform to one or more standardized form factors or MSA Multi-Source Agreements, including but not limited to QSFP, QSFP+, CXP, CFP, CFP2, CFP4, XFP, SFE, SFP and SFP+form factors. It should also be understood, however, that optoelectronic modules (optical modules) do not necessarily have to follow standardized form factor requirements and can have any size or configuration required by a particular design.

The optoelectronic conversion module 12 according to some embodiments may be configured to transmit and receive electrons and/or optical signals at different data rates per second, including but not limited to 10 gigabits per second (G), 40G, 100G or higher. As used herein, the terms "10G", "40G", "100G", and similar terms represent rounded approximations of conventional signaling rates and have the meaning commonly understood by those skilled in the art. Furthermore, optoelectronic modules according to some embodiments may be configured to perform transmission and reception of optical signals at different wavelengths, including but not limited to 850 nm, 1310 nm, 1470 nm, 1490 nm, 1510 nm, 1530 nm, 1550 nm, 1570 nm, 1590 nm or 1610 nm. Further, the optoelectronic modules can be configured to support various transmission standards, including but not limited to Ethernet, Fiber Channel, INFINIBAND, and Synchronous Optical Network (SONET) and/or Synchronous Data Hierarchy (SDH).

It will be appreciated that fiber optic cables having transceivers integrated into electrical plug connectors on either end are described herein as active fiber optic cables. Active Optical Cables (AOCs) that provide plug connectors at either end have an appearance similar to conventional connecting electrical cables and can be drop-in replacements for electrical cables, but offer optical fiber performance. To integrate the transceiver into the AOC, the electrical plug connector includes a housing that defines a cavity therein. The optical fiber cables are designed to transmit large amounts of information at high speed. Each optical fiber cable may include one or more optical fibers that act as waveguides for optical signals. To transmit information via the optical fiber cable, electrical signals are converted to optical signals at the transmitting side, and then converted back to electrical signals at the receiving side. Electrical-to-optical and optical-to-electrical conversions are performed by transceivers that include optoelectronic elements configured to perform these conversions. In some configurations or designs, the transceiver includes one or more optoelectronic components mounted on one or more printed circuit boards housed within the optical connector.

Optionally, the active optical cable assembly includes a DP active optical cable or an HDMI optical fiber cable. The HDMI optical fiber cable (hdmi AOC Cable) is also called an active optical cable. The currently most used HDMI fiber optic cable is version 2.0, which is compatible with version 1.4 and is suitable for most machines and equipment. Of course, it depends on the needs. Version 2.0 perfectly achieves 4K/60 HZ, the version 1.4 is 4K/40 HZ, and the version 1.3 is 1080p.

Figure 3:
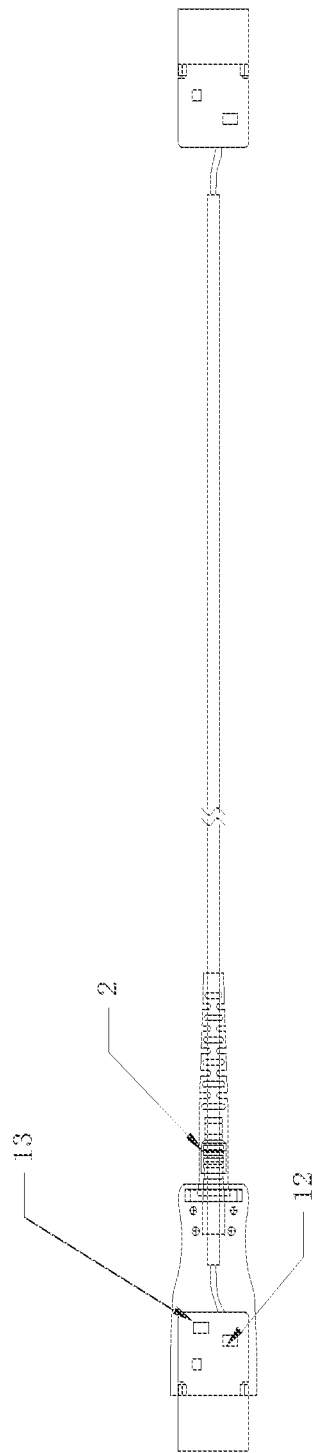
FIG. 3 is a schematic structural diagram of the active optical cable assembly in some embodiments of the present disclosure.
Figure 4:
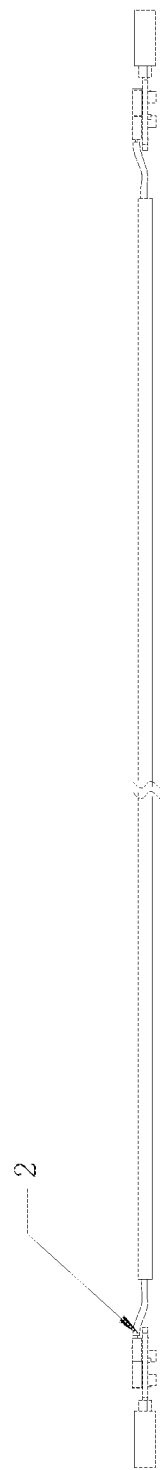
FIG. 4 is another schematic structural diagram of the active optical cable assembly in some embodiments of the present disclosure.

Referring to FIG. 3 and FIG. 4, the second aspect of the present disclosure provides an active optical cable assembly, including an active optical cable 2 and active optical cable connectors 1 disposed at both ends of the active optical cable, the active optical cable connectors 1 are the active optical cable connector 1 described in the first aspect. Further, the active optical cable 2 and the active optical cable connector 1 are fixed by the COB process and the optical fiber end face processing process. The COB process includes wire bonding and molding, which is a process of packaging bare integrated circuit chips (IC Chip) to form electronic components, wherein I/O of the COB is extended out via the wiring of the package by technologies such as WireBonding, flip chip, tape automatic bonding (TAB), and the like.

Since the copper cable part in the active optical cable is cancelled, and the active optical cable is manufactured based on the existing optical fiber using COB processes, while ensuring communication performance of the active optical cable, the outer diameter of the active optical cable is not more than 5 mm.

It can be understood that fixing by the optical fiber end face processing technology, the weight of the active optical cable is further reduced, and the linear density of the active optical cable is not more than 10 g/m.

The present disclosure has the following beneficial effects.
  i) Lightweight: The present disclosure uses UWB technology to transmit low-speed signals in AOC such as communication protocol, handshake signal, EMARK detection signal, plug-in detection signal, etc., instead of the copper wire used for the above signal transmission in the conventional scheme. The cable part only contains optical fibers and necessary protective structures for high-speed signal transmission, which greatly simplifies the cable structure and reduces the size and weight of the cable.
  ii) Process simplification: In the present disclosure, after the copper wire for low-speed signal transmission is cancelled, the copper wire processing and welding process is no longer involved in the entire AOC process, which can greatly simplify the production process and reduce equipment and manpower requirements. The present disclosure can be realized by well-developed former stage optical module COB process and rear stage optical fiber end face processing.
  iii) Product reliability improvement: With the technical solution of the present disclosure, there are no longer any failure factors such as high temperature welding, fiber damage during welding, circuit damage, etc., that lead to product failure during the AOC manufacturing process. Meanwhile, the simplified product structure itself also greatly reduce the probability of product failure. More importantly, it completely solves the failure risk caused by objective factors such as the complex processing process, backward technology, low technology maturity and unreliable structure of the current optoelectronic hybrid cable.

What is claimed is:

1. An active optical cable connector comprising:
a power supply interface;
an optoelectronic conversion module; and
a short-range wireless communication module,
wherein the power supply interface is electrically connected with the optoelectronic conversion module and the short-range wireless communication module, respectively, and
wherein the active optical cable connector is connectable to both ends of an active optical cable, and wherein the short-range wireless communication module of the active optical cable connector connected to one end of the active optical cable is configured to transmit a control signal and a low-speed signal to the short-range wireless communication module of the active optical cable connector connected to another end of the active optical cable.

2. The active optical cable connector according to claim 1, wherein the control signal comprises an optical cable handshake signal, an EMARK detection signal and an interface plug-in detection signal.

3. The active optical cable connector according to claim 1, wherein the short-range wireless communication module comprises at least one of a Bluetooth module, a ZigBee module, a near field communication (NFC) module or an ultra wide-band (UWB) module.

4. The active optical cable connector according to claim 3, wherein the short-range wireless communication module comprises the UWB module, and the UWB module is surface-mounted by a surface mount technology (SMT) process.

5. The active optical cable connector according to claim 4, wherein the UWB module comprises a positioning unit, and
wherein the positioning unit is configured to position the optoelectronic conversion module.

6. The active optical cable connector according to claim 1, wherein the optoelectronic conversion module comprises:
a transmitting unit, comprising a driving chip, a laser emitting array and a lens; and
a receiving unit, comprising a laser signal detector and an amplifying chip.

7. An active optical cable assembly, comprising:
an active optical cable; and
the active optical cable connector according to claim 1, disposed at both ends of the active optical cable.

8. The active optical cable assembly according to claim 7, wherein the active optical cable and the active optical cable connector are fixed by a chip on board (COB) process and an optical fiber end face processing process.

9. The active optical cable assembly according to claim 7, wherein an outer diameter of the active optical cable is not more than 5 mm.

* * * * *

UNITED STATES PATENT AND TRADEMARK OFFICE
CERTIFICATE OF CORRECTION

PATENT NO. : 11,923,902 B2  
APPLICATION NO. : 17/812029  
DATED : March 5, 2024  
INVENTOR(S) : Tang et al.

Page 1 of 1

It is certified that error appears in the above-identified patent and that said Letters Patent is hereby corrected as shown below:

On the Title Page

Item (73) Assignee, Please change "Shenzhen, CA" to --Shenzhen, CN--.

Signed and Sealed this  
Fourth Day of November, 2025

John A. Squires  
*Director of the United States Patent and Trademark Office*